April 10, 1956   E. JUNKER   2,741,017
PROCESS FOR THE PRODUCTION OF A TEMPLET FOR THE
MACHINING OF PISTON RINGS TO A PREDETERMINED
SHAPE ON A COPYING TURNER'S LATHE
Filed Oct. 23, 1951
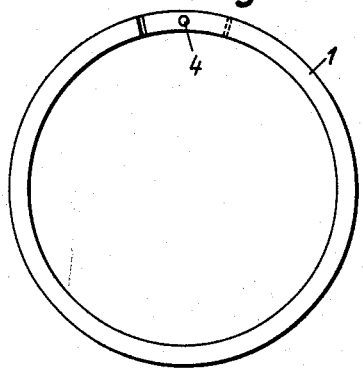
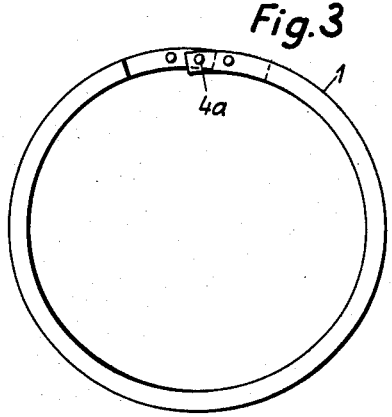
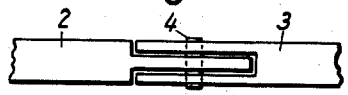
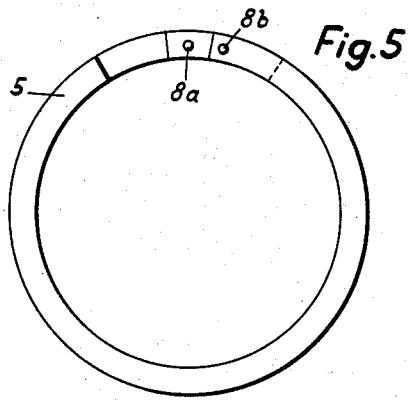
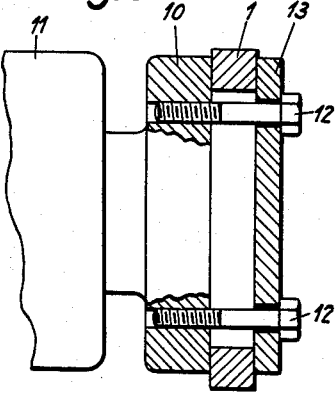
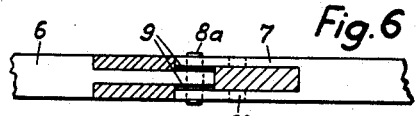
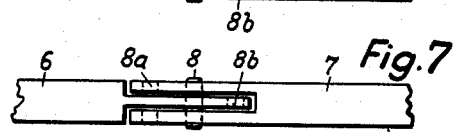
Inventor
Emile Junker
By Singer, Stern & Carlberg
Attorneys United States Patent Office 2,741,017
Patented Apr. 10, 1956

2,741,017

PROCESS FOR THE PRODUCTION OF A TEMPLET FOR THE MACHINING OF PISTON RINGS TO A PREDETERMINED SHAPE ON A COPYING TURNER'S LATHE

Emile Junker, Zurich, Switzerland

Application October 23, 1951, Serial No. 252,776

1 Claim. (Cl. 29—156.63)

The invention relates to a templet for the machining of piston rings to a predetermined shape on a copying turner's lathe.

It is a main object of the invention to provide a templet of the kind referred to which has accurately the shape to which the piston rings are to be machined, over its entire circumference, while hitherto copying cams did so on individual ranges of their circumference only.

It is another object of the invention to provide a process for the production of such a templet which dispenses with mathematical calculations, which in view of the fact that the modulus of elasticity of cast iron i. e. of the material of which pistons rings are mainly made, varies during the loading of the "strongly curved beam" as constituted by a split piston ring, are both involved and inaccurate.

According to a main feature of the invention the process for the production of a templet for the machining of piston rings to a predetermined shape on a copying turner's lathe comprises the consecutive steps of applying the shape of an open piston ring to an open ring by elastic deformation thereof, and fixing the said ring in this condition.

This generic process can be carried out in two specific forms; according to a first embodiment, a ring may first be turned cylindrically inside and outside; a mortise joint is then milled into the ring; the ring is then spread out into a condition retaining overlapping of the ends of the ring in the mortise joint; and the ring is eventually fixed in this spread condition.

According to the second embodiment of the process according to the invention a mortise joint is first milled into a pre-turned ring; the ring is then spread out into a condition retaining an overlapping of the ends of the ring in the mortise joint; turned cylindrically concentrically inside and outside in the spread condition; and eventually released and fixed in the relaxed condition.

A ring produced according to the process set forth hereinabove, preferably from the same material as the piston rings, is directly available as a copying templet for the machining of these piston rings to a predetermined shape.

Further objects and features of the invention will become clear from the following description of same embodiments thereof given by way of example with reference to the accompanying drawing in which:

Fig. 1 shows a ring in the closed condition in elevation and Fig. 2 is a plan view of the mortise joint on a larger scale.

Figs. 3 and 4 correspond to Figs. 1 and 2, respectively showing the ring in the spread condition.

Figs. 5 and 6 correspond to Figs. 1 and 2, respectively, and show a ring and milled out mortise joint of a second embodiment.

Fig. 7 corresponds to Fig. 6, and shows the mortise joint in a contracted condition.

Fig. 8 shows a clamping device for the production of the templet on a copying turner's lathe.

The pre-turned ring 1 (Figs. 1, 2) is cut up in such a manner that its two ends 2 and 3 overlap one another, the overlapping being so large that it allows a mutual attachment of the two ends 2 and 3 of the ring to one another even after spreading the ring open. In the middle of the overlapping portions a hole is drilled for taking in the cylindrical pin 1. In this condition the ring 1 is turned cylindrically accurately concentrically. According to the prescription of spreading, the ring 1 is spread up after taking out the cylindrical pin 4, and a hole is drilled at the ends 2 and 3 of the lap joint (Figs. 3, 4) for taking in the cylindrical pin 4a, the ring being fixed in the prescribed position.

According to the second embodiment of the new process a lock is machined out of the preturned ring 5 (Figs. 5, 6), when cutting the same up, in such a manner that its two ends 6 and 7 overlap one another in the relaxed condition. The hatched areas shown in Fig. 6 are milled away, and the ring 5 is cut open along the lines 9. Before machining-out the lock the holes 8a and 8b are drilled according to Fig. 6 for the purpose of accommodating the cylindrical pins later. The ring 5 is then compressed corresponding to the material milled off. In this condition the hole 8b is drilled right through, and by means of the cylindrical pin 8 the ring is held in this position (Fig. 7) for being turned to measure concentrically inside and outside. By taking away the cylindrical pin 8 the ring is relaxed to the shape according to Fig. 3, and is fixed by means of the cylindrical pin 4a in the hole 8a.

To sum up, the two modifications differ in this:

(a) The first process starts with a round ring turned cylindrically at the outer and at the inner circumference into which ring a lock is then machined. Thereafter the ring is spread up to the extent required, but so that the lock portion still overlaps. In this position, in which the ring is under tension, it is then fixed.

(b) In the second embodiment of the process the ring is, contrariwise, eventually in a relaxed condition. The start is made with a round ring from which the lock is milled out in such a manner that the ring can be compressed by overcoming its inherent resiliency. After the compressing has been effected the ring is turned cylindrically concentrically, relaxed and then fixed.

On the basis of the annular templets thus obtained the copying cam is then produced.

The templet 1 produced according to either the one or the other of the two modifications (a) or (b) is then clamped between a clamping disc 10, journalled in the headstock 11, and a counterdisc 13 by tightening the screws 12 for the purpose of producing the copying cam.

While I have described hereinabove what may be considered as particularly useful embodiments of my invention, I wish it to be understood that I do not limit myself to the accurate details of construction or to the dimensions of the embodiments shown and described, for obvious modifications will occur to a person skilled in the art depending on the special circumstances and conditions in which my invention may be used.

What I claim as my invention and desire to secure by Letters Patent, is:

Method of producing a templet for use in machining piston rings, comprising the steps of forming an oversized ring-shaped templet blank, milling a partially open mortise joint in said blank, closing said mortise joint, locking said mortise joint in said closed position, machining the inner and outer surfaces of said blank into cylindrical shape of predetermined dimensions, unlocking said mortise joint to allow the templet to expand back into its non-tensioned condition, and locking said partially open mortise joint in said non-tensioned condition of the templet.

(References on following page)

References Cited in the file of this patent

UNITED STATES PATENTS

| | | |
|---|---|---|
| 410,426 | Metcalf | Sept. 3, 1889 |
| 1,284,439 | Pedrick | Nov. 12, 1918 |
| 1,314,534 | Mummert | Sept. 2, 1919 |
| 1,403,479 | Blettner | Jan. 17, 1922 |
| 1,515,472 | Frank | Nov. 11, 1924 |
| 1,705,643 | Okochi | Mar. 19, 1929 |
| 1,730,429 | Jennings | Oct. 8, 1929 |
| 1,732,630 | Bennet | Oct. 22, 1929 |
| 1,956,505 | Horner | Apr. 24, 1934 |
| 2,242,406 | Stewart | May 20, 1941 |
| 2,421,065 | Hoffer | May 27, 1947 |